Sept. 29, 1959        F. PASSLER        2,906,681
PROCESS FOR THE MANUFACTURE OF CARBON TETRACHLORIDE
Filed Aug. 27, 1957
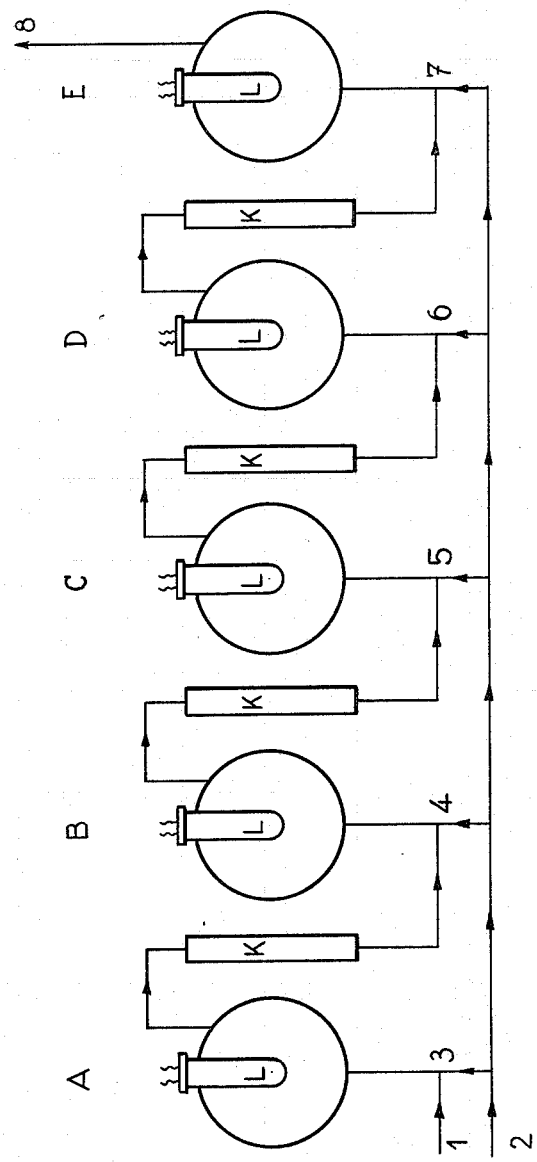
INVENTOR
*FRITZ PASSLER*
BY Connolly and Hutz
his ATTORNEYS United States Patent Office 2,906,681
Patented Sept. 29, 1959

2,906,681

PROCESS FOR THE MANUFACTURE OF CARBON TETRACHLORIDE

Fritz Passler, Burgkirchen, Upper Bavaria, Germany, assignor to Farbwerke Hoechst Aktiengesellschaft vormals Meister Lucius & Brüning, Frankfurt am Main, Germany, a corporation of Germany Application August 27, 1957, Serial No. 680,591

Claims priority, application Germany August 30, 1956

7 Claims. (Cl. 204—163)

The present invention relates to a process for the manufacture of carbon tetrachloride from methane and chlorine.

In addition to thermal and catalytic processes, there are known processes in which mixtures of methane and chlorine are reacted by radiation with light of suitable wave length. In the photochlorination in liquid phase, for example in the presence of a solvent, the reaction yields unsatisfactory results. When carried out on an industrial scale in the gaseous phase, the process involves considerable inconvenience since, when operating with greater units, it becomes difficult to dissipate the heat due to the high reaction heat of 95 kilo calories per mol of carbon tetrachloride an undesirable increase in temperature and decomposition of the reaction products take place with separation of carbon.

According to the hitherto usual processes in gaseous phase, overheating has been avoided by either diluting the methane-chlorine mixture with a part of the reaction product or by using a large excess of methane. Both working methods involve disadvantages.

When the fresh gases are diluted with a part of the reaction product, the quantitative yield of the photochlorination is considerably reduced already at the outset of the reaction since the hydrogen chloride brings about a premature interruption of the reaction chains. It is furthermore necessary to use in said process rotary gas pumps in order to move the highly corrosive mixture of hydrogen chloride, chlorine and carbon tetrachloride at elevated temperature. Pumps of this kind, especially in case they fail to work, can cause unpleasant disturbances. When an addition of an excess amount of methane—for the formation of carbon tetrachloride an excess of chlorine is necessary—shall moderate the reaction and when the process is simultaneously carried out with a gas mixture having a composition outside the explosion range, the products first obtained have an inferior chlorine content. It is then necessary to transform these products into carbon tetrachloride by gradually adding the stoichiometrically required amount of chlorine. Furthermore, soot separates very often on the radiation lamps reducing the yield of light.

Now, I have found that carbon tetrachloride can be produced in a nearly quantitative yield when carrying out the reaction of methane with chlorine at temperatures between 0° and 400° C. under the action of light in a manner such that first an excess amount of chlorine is used and that the reaction mixture is then further reacted with gradually added methane under the action of light. In this manner, the reactant of which a larger volume is required for the reaction is used first. The heat capacity is very large immediately so that much heat can be taken up (absorbed) and the reaction temperature can be easily regulated. The use of devices which may cause interruptions of work is superfluous when operating according to the process of the present invention.

The annexed drawing shown diagrammatically represents a scheme of a unit suitable for carrying out the process of the present invention.

Into reactor A which is provided with a source of light L there are introduced a large excess of chlorine through conduit 1 and methane through conduit 2. The gases are mixed at 3 before they enter into the reactor. Under the action of light, the methane reacts almost quantitatively with a part of the chlorine, whereby an increase in temperature takes place. The escaping reaction gases are conducted via a gas cooler K into reactor B, after having been mixed at 4 with a further amount of methane. In reactor B another part of the chlorine is used up. Reactor B may be connected in series with further reactors as shown for example in the drawing (reactors C, D and E) in which the reaction is carried out in a similar manner. Chlorine is introduced into the first reactor in an excess such that its heat capacity is sufficient to avoid an undesired overheating and methane is added at points 4, 5, 6 and 7 in amounts such that the reaction heat does not increase in an undesirable manner. It is preferable to operate in a manner such that the molar ratio of the total amount of methane to the amount of chlorine is about 1:4. It is possible, however, to use one component in excess.

The temperatures in the reactors are between 0° and 400° C., preferably between 200° and 300° to 320° C. Lower temperatures lead to smaller yields whereas higher temperatures result in a larger portion of unsaturated chlorinated hydrocarbons in the reaction product, such as tetrachlorethylene.

Generally the reaction is carried out under normal pressure, it is possible, however, to operate under reduced or elevated pressure. The number and the size of the reactors can be varied and adapted according to the circumstances in each case.

As sources of light there may be used those which produce light (short wave) so rich in energy that the energy is sufficient to split the chlorine molecules into chlorine atoms. The reaction product escaping at 8 and still containing small amounts of unreacted chlorine and methane can be worked up at once in usual manner. It is likewise possible previously to eliminate in an after-reactor last traces of chlorine by thermal or catalytic reactions.

As compared with the known processes, the process according to the invention has the following advantages:

(1) Methane and chlorine are reacted to form carbon tetrachloride in an almost quantitative yield without the use of moved members.

(2) The reaction can be easily controlled, no danger of explosion exists and carbon is not separated. Even when overheating neither soot is formed nor inflammation occurs. This is due above all to the fact that the thermally unstable and partially chlorinated methanes are further chlorinated at once at the high chlorine concentration to form the stable carbon tetrachloride.

(3) When operating with relatively small reactors the initially high excess of chlorine allows of a good utilization of the light since the chlorine absorbs to a large extent the chemically active rays. Furthermore, the excess of chlorine does not impair the quantitative yield in contradistinction to hydrogen chloride.

(4) When operating with an initial excess of methane and adding stepwise chlorine a greater number of reactors connected in series is required than in the process according to the invention.

The following examples serve to illustrate the invention, but they are not intended to limit it thereto.

*Example 1*

(A) In a unit consisting of two reactors provided with mercury vapor lamps there is introduced into the first reactor per hour a mixture of 1 cubic meter of gaseous chlorine and 0.15 cubic meter of methane. When the mixture leaves the first reactor further 0.11 cubic meter of methane is added and the whole is introduced into the second reactor. The gases escaping from the second reactor consist of:

48.6% by weight of carbon tetrachloride
48.5% by weight of hydrogen chloride
1.2% by weight of free chlorine
1.1% by weight of tetrachlorethylene
0.4% by weight of chloroform
0.2% by weight of methane The yield corresponds to a chlorine reaction of 98.8% of the theory.

Owing to the small quantities of gas passed through, a relatively large amount of heat is dissipated and eliminated so that a relatively small excess of chlorine and accordingly a small number of reactors are sufficient. The temperature in the center of the reactors amounts to 300–320° C. and near the walls to 180–200° C.

(B) In case the reaction product is subsequently conducted at 320° C. through a reaction furnace filled with active carbon as catalyst the residual chlorine is likewise reacted and the reaction mixture has then the following composition:

49.0% by weight of carbon tetrachloride
49.1% by weight of hydrogen chloride
1.4% by weight of tetrachlorethylene
0.4% by weight of chloroform
0.1% by weight of methane This yield corresponds to a quantitative reaction of chlorine.

*Example 2*

Into a unit of 8 reactors provided with mercury vapor lamps, there is introduced into the first reactor per hour a mixture of 400 cubic meters of gaseous chlorine and 13 cubic meters of methane. Before entering into the second to seventh reactor the gas is mixed with 13, 13, 15, 18, 22 and 10 cubic meters of methane. The eighth reactor serves as after reactor. The temperature in the reactors amounts to 300–320° C. The first two cooling devices are maintained at 20° C. and the following at about 60° C. in order to prevent condensation of the reaction products. The composition of the reaction product corresponds to the composition of the product obtained in Example 1A.

I claim:

1. A process for the manufacture of carbon tetrachloride, which comprises reacting in the gaseous state at a temperature in the range from 0 to 400° C. and under the action of light in a first stage methane with chlorine which chlorine is in excess of the stoichiometric ratio of 1:4, and adding further portions of methane to react with the unconverted chlorine in the gaseous state so that the chlorine is substantially converted into carbon tetrachloride.

2. A process for the manufacture of carbon tetrachloride, which comprises reacting in the gaseous state at a temperature in the range from 200 to 320° C. and under the action of light in a first stage methane with chlorine which chlorine is in excess of the stoichiometric ratio of 1:4, and progressively adding further portions of methane to react with the unconverted chlorine in the gaseous state so that the chlorine is substantially converted into carbon tetrachloride.

3. A process for the manufacture of carbon tetrachloride, which comprises reacting in the gaseous state at a temperature in the range from 0 to 400° C. under normal pressure and under the action of light in a first stage methane with chlorine which chlorine is in excess of the stoichiometric ratio of 1:4, and progressively adding further portions of methane to react with the unconverted chlorine in the gaseous state so that the chlorine is substantially converted into carbon tetrachloride.

4. A process for the manufacture of carbon tetrachloride, which comprises reacting in the gaseous state at a temperature in the range from 0 to 400° C. and under the action of light in a first stage methane with chlorine which chlorine is in excess of the stoichiometric ratio of 1:4 and progressively adding further portions of methane to react with the unconverted chlorine in the gaseous state which methane is added in such an amount that, in summary, chlorine and methane are reacted in a ratio by volume of about 4:1.

5. A process for the manufacture of carbon tetrachloride, which comprises reacting in the gaseous state at a temperature in the range from 0 to 400° C. and under the action of light in a first stage methane with chlorine which chlorine is in excess of the stoichiometric ratio of 1:4, and progressively adding further portions of methane to react with the unconverted chlorine in the gaseous state which methane is added in such an amount that, in summary, a small stoichiometric excess of methane is used.

6. A process for the manufacture of carbon tetrachloride, which comprises reacting in the gaseous state at a temperature in the range from 0 to 400° C. and under the action of light in a first stage methane with chlorine which is in excess of the stoichiometric ratio of 1:4, and progressively adding further portions of methane to react with the unconverted chlorine in the gaseous state which methane is added in such an amount that in summary, a small stoichiometric excess of methane is used which reacts with small amounts of non-reatced chlorine and methane in a manner known per se.

7. A process for the manufacture of carbon tetrachloride, which comprises reacting in the gaseous state at a temperature in the range from 200 to 320° C. under normal pressure and under the action of light in a first stage methane with chlorine which chlorine is in excess of the stoichiometric ratio of 1:4, and progressively adding further portions of methane to react with the unconverted chlorine in the gaseous state which methane is added in such an amount that, in summary, chlorine and methane are reacted in a ratio by volume of about 4:1.

References Cited in the file of this patent

UNITED STATES PATENTS 2,688,592 Skeeters et al. _____ Sept. 7, 1954
2,706,709 Wintersberger et al. _____ Apr. 19, 1955